Oct. 16, 1962     E. O. HALL ETAL     3,058,349
CONTROLLER
Filed Sept. 9, 1957     2 Sheets-Sheet 1

INVENTORS.
EDWARD O. HALL
ROLAND H. BATES
BY *Arthur N. Swanson*
ATTORNEY.

Oct. 16, 1962   E. O. HALL ETAL   3,058,349
CONTROLLER
Filed Sept. 9, 1957   2 Sheets–Sheet 2

INVENTORS.
EDWARD O. HALL
BY   ROLAND H. BATES

ATTORNEY.

United States Patent Office 3,058,349
Patented Oct. 16, 1962

3,058,349
CONTROLLER
Edward O. Hall and Roland H. Bates, Hatboro, Pa., assignors to Minneapolis-Honeywell Regulator Company, Minneapolis, Minn., a corporation of Delaware
Filed Sept. 9, 1957, Ser. No. 682,841
3 Claims. (Cl. 73—398)

This invention relates to a transducer, i.e. a device having an input in the form of energy of one type and an output in the form of energy of the same or of another type.

More specifically, this invention relates to a transducer in which the input is a fluid pressure and the output is an electric current.

It is an object of this invention, therefore, to provide a transducer for translating a fluid-pressure signal into an electric signal representative thereof. This transducer includes: a pivoted force-balance beam; fluid-pressure-responsive means imposing a force upon said beam in one direction; electric-energy-responsive means arranged to impose an opposing force upon said beam; electric-signal-varying means positioned by said beam, said electric signal being applied to said electric-energy-responsive means; and manually operable means for adjusting the initial or zero position of said beam.

A better understanding of the present invention may be had from the following detailed description when read in connection with the accompanying drawing in which.

Figure 1:
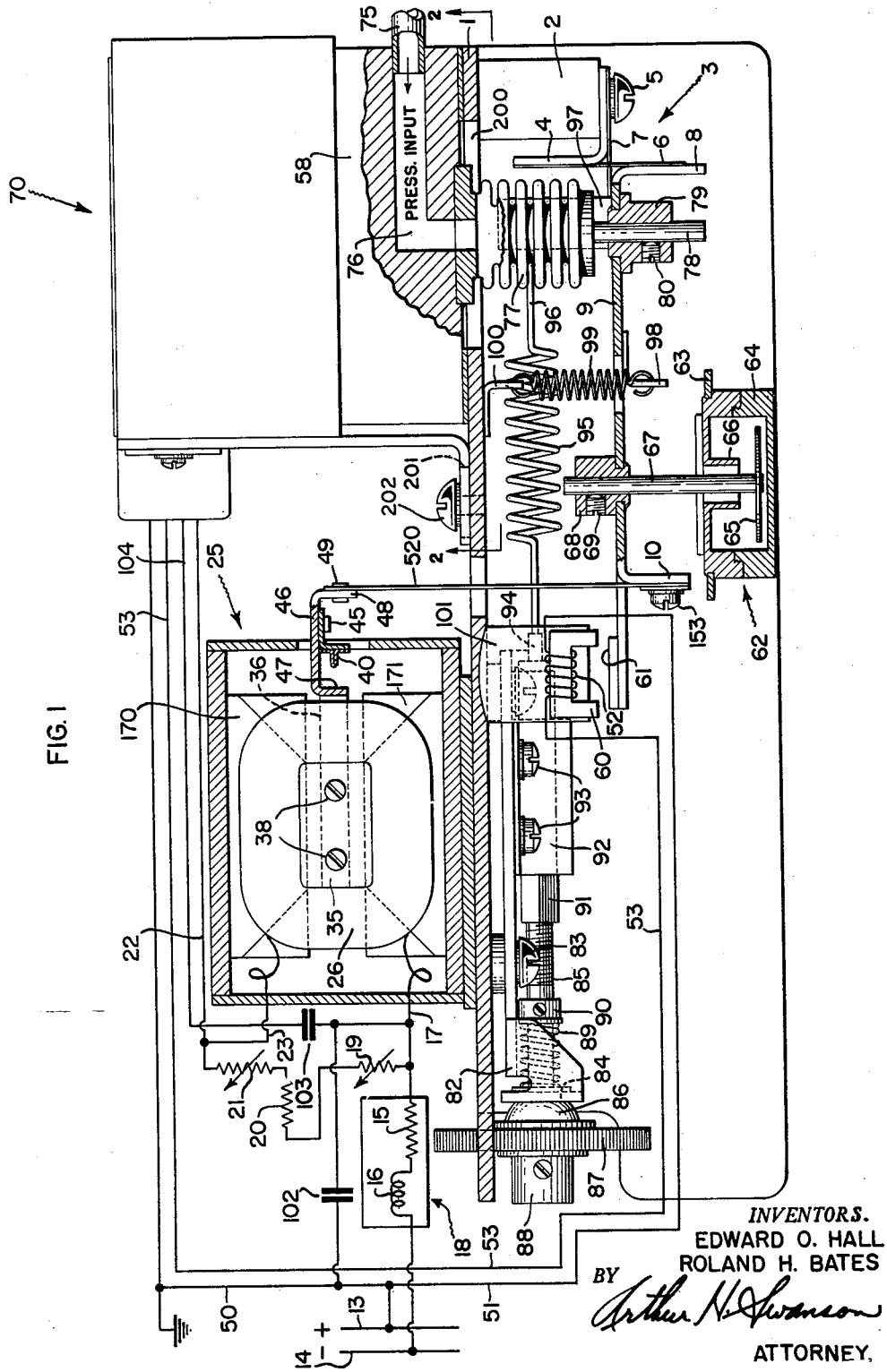
FIG. 1 is a diagrammatic and schematic showing of the mechanical and electrical elements of the device with parts in vertical, longitudinal, cross section.
Figure 2:
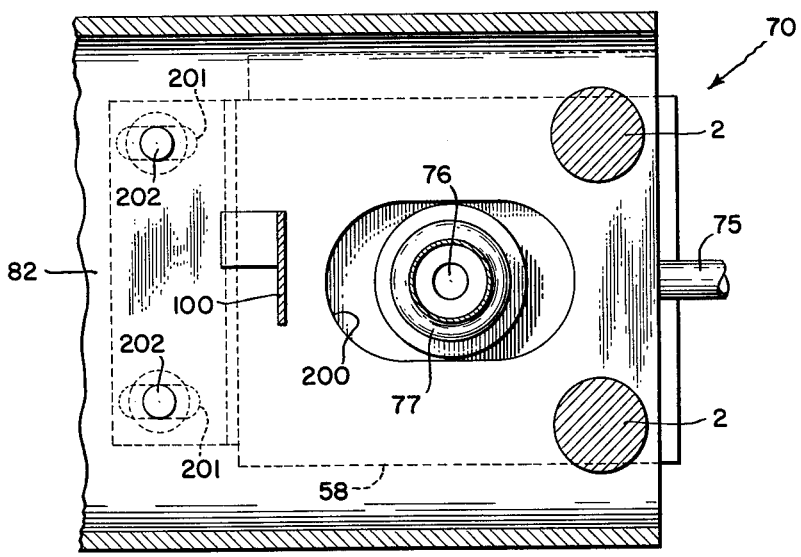
FIG. 2 is a diagrammatic and schematic showing in horizontal, longitudinal, cross section as viewed from beneath.

The transducer of this invention comprises a support 1 on which is mounted an input element in the form of a fluid-pressure-responsive means comprising a manifold 58 having an inlet pipe 75 connected thereto and communicating with one end of an inlet conduit 76 which terminates at its other end in the interior of a bellows 77.

Inlet pipe 75 is adapted for connection to a means for varying the pressure of a fluid. These means may be operated manually or in response to a measuring and fluid transmitting instrument responsive to any one of a large number of variables, such as temperature, flow, pressure, or the like.

Bellows 77 is mounted at its upper, stationary end on manifold 58 on support 1 and carries, at its lower, free or movable end, a bellows stem 78 which is secured by means of a bellows rivet 79 and a screw 80 to force-balance beam 9. Manifold 58 and bellows 77 mounted on it can be moved parallel to force-balance beam 9 to provide adjustable force span.

Support 1 carries a pair of pillars 2. On pillars 2 is mounted a cross spring pivot, generally indicated 3. This cross spring pivot includes an angle 4 which is secured to the bottom of pillars 2 by a pair of screws 5. A vertical, flat strip 6 and a horizontal, flat strip 7 are attached at the flat surfaces adjacent the ends thereof to angle 4 and to flange 8 and to beam 9. Pivot 3 supports beam 9 for rocking movement about the intersection of strips 6 and 7.

Beam 9 has a flange 10 thereon which is spaced from pivot 3 and which has secured to it, by screw 153, one end of a strap 520.

The opposite end of strap 520 is secured by rivet 49 to flange 48 which forms part of the end portion 46 of a supporting arm 36. End portion 46 is secured to supporting arm 36 by flange 47.

The output element of this transducer comprises electric-energy-responsive means 25 including supporting arm 36 which is mounted on support 1 by means of a bracket 45 which supports a torsion angle pivot 40 on which supporting arm 36 is carried. Torsion angle pivot 40 is secured at its ends to support 1 through the case for electric-energy-responsive means 25 and forms a pivot about which supporting arm 36 and the parts carried thereby may rock.

On supporting arm 36 is mounted an output coil 26 by means of a bobbin 35 which may be formed of "Bakelite" or other non-magnetic material. During winding and after the coil 26 has been wound upon the bobbin 35, the coil may conveniently be impregnated with a suitable insulating resin. The bobbin 35 is secured to supporting arm 36 by means of a pair of screws 38. The magnetic field for the electric-energy-responsive means 25 is produced by a plurality of permanent magnets of which two (170 and 171) are shown in the drawing. Magnets 170 and 171 extend in a horizontal direction beyond the ends of the coil 26 to insure that when the coil 26 moves, it will remain within the magnetic field created by the permanent magnets 170, 171. The faces of the magnets 170 and 171 are shaped so as to evenly distribute the magnetic flux over the area of the coil 26.

Coil 26 is connected to a source of direct current electricity. From the negative side 14 of this source current is conducted to the current output device of the transducer. This current output device is generally indicated 18 and comprises an inductive reactance comprised by a choke coil 16 and a resistive reactance comprised by a resistor 15. Current output device 18 may be one of many well-known electrically operated indicators, recorders, and/or controllers. Current output device 18 is connected by conductor 17 to one terminal of the coil 26. The opposite terminal of the coil 26 is connected by conductors 23 and 22 to one terminal of an oscillator position detector, generally indicated 70. The details of this oscillator position detector 70 are disclosed in application for U.S. patent; S.N. 508,705; by William J. Popowsky; now Patent 2,938,173.

Across coil 26 is connected the span adjustment which comprises adjustable resistors 19 and 21 and fixed resistor 20. The common side of damping capacitors 102 and 103 is connected to one side of coil 26 at conductor 17, the other side of capacitor 102 being connected to conductors 50 and 13 and the other side of capacitor 103 being connected to the oscillator position detector 70 through conductor 104.

The positive side 13 of the direct current source is connected through conductor 50 to another terminal of the oscillator position detector 70. The positive side 13 of the direct current source is also connected by conductor 51 to coil 52 which is connected by conductor 53 to a third terminal of the oscillator position detector 70.

Coil 52 forms part of an electric-signal-varying means which includes a C-shaped iron core 60 on which the coil 52 is wound. Cooperating with the open ends of core 60 is an armature disc 61 mounted on a movable portion of beam 9. Rocking movement of beam 9 about its pivot 3 causes armature 61 to vary the reluctance of the magnetic path through the core 60 and thereby to vary the flow of current through the coil 52. Support 101 has spheroidal contact with support 1 to provide all degrees of angular alignment between core 60 and disc 61.

In order to damp unwanted oscillations of the beam 9 there is provided a dashpot, generally indicated 62. Dashpot 62 is mounted on support 1 by means of a pair of tangs 63 which support a hollow vessel 64 having an opening 66 in the upper end thereof. Vessel 64 is adapted to contain at any attitude in the hollow interior thereof a viscous fluid, such as oil. In this oil is immersed a disc 65 mounted on one end of a stem 67. Stem 67 is secured, at its opposite end, to beam 9 by means of a rivet 68 and a screw 69.

Manually operable means are provided for adjusting the zero or initial position of the beam 9. These zero-adjusting means comprise a guide bracket 82 secured to support 1 by screws 83. Guide bracket 82 has a flange 84 on it through which extends a first adjusting screw 85 which has a screw threaded engagement with the interior of a second adjusting screw 91. Disc 87 having a knurled edge serves as means for manually rotating first adjusting screw 85 because disc 87 is secured to first adjusting screw 85. Disc 87 has a half-ball 86 attached to it which seats in the perforation in flange 84. First adjusting screw 85 may be turned by means of a screwdriver by inserting the end of the screwdriver in the slot in the screwhead 88. A small spring 89 is interposed between one face of flange 84 and collar 90, which is secured to first adjusting screw 85. Spring 89 serves to bias the first adjusting screw 85 into its engagement with second adjusting screw 91.

Second adjusting screw 91 has a flat face on one surface thereof which engages with a flat face on guide plate 92 which is secured to the support 1 by screws 93. Guide plate 92 thus prevents second adjusting screw 91 from rotating but permits second adjusting screw 91 to translate horizontally as seen in the drawing. The right hand end of second adjusting screw 91 has an attachment 94 which secures the second adjusting screw to one end of a large spring 95 which is secured, at opposite end 96, to the upper end of pillar 97 secured to beam 9.

Beam 9 also has secured to it a hook 98 which is connected to one end of a spring 99 which is fastened at its other end 100 to support 1.

The operation of the transducer of this invention is as follows: fluid under pressure is applied through pipe 75 and conduit 76 to the interior of bellows 77. Any variation in the pressure of this fluid causes beam 9 to rock about its pivot 3. This rocking movement of beam 9 causes armature 61 to vary the reluctance of the magnetic circuit formed by armature 61 and core 60 and thereby varies the flow of current through coil 52. This change in the flow of current through coil 52 is applied to two terminals of the oscillator position detector 70. Oscillator position detector 70 in turn causes the current flow through conductors 22 and 23, coil 26 and conductor 17 to vary. This change of the flow of current through coil 26 causes the magnetic field of the coil 26 to vary. The interaction of the magnetic field of the coil 26 with the magnetic field of the permanent magnets 170 and 171 causes the coil 26 to rock supporting arm 36 about pivot 40. This rocking movement of coil 26 and supporting arm 36 is transmitted through strap 520 to beam 9 and causes beam 9 to move in the direction opposite to that in which beam 9 was moved by bellows 77 in response to the variations in the fluid pressure applied to the interior of the bellows. Fluid-pressure-responsive means including bellows 77 therefore establish a first torque on beam 9 while electric-energy-responsive means 25 establishes a second torque on beam 9 in opposition to this first torque. Armature 61 is moved by beam 9 relative to core 60 so as to vary the reluctance of the magnetic path through core 60 and armature 61. This varies the flow of current through coil 52 and acts, in the manner set forth above, simultaneously to regulate the value of the electric output of the electric-energy-responsive means 25, which establishes a second torque which rebalances beam 9, and to establish the electric output of the device as an output proportional to the variations in the input pressure.

The current flowing through coil 26 produces a flux field which reacts with the magnetic field produced by the permanent magnets 170—171. The coil 26 is deflected at right angles to the principal flux field of these permanent magnets. The movement of coil 26 is restricted because supporting arm 36 lies between these permanent magnets 170—171. In one form of the apparatus the motion of supporting arm 36 is restricted to approximately four degrees. This is not objectionable in a device of this type because it is desired that it produce a high output torque through a relatively small angle. This characteristic makes the apparatus very suitable for use in a transducer wherein a high balancing force may be required on the force balance beam 9 while the actual motion of the beam is very small.

It will also be readily apparent that the apparatus is very rugged in construction in that the only moving portion is the coil. There is no problem of friction because the apparatus is supported by a torsional pivot which introduces no loading on the apparatus over the small angle through which the supporting arm is operative.

The electric-energy-responsive means 25 has a maximum of active magnetic material acting directly around the coil 26. This permits obtaining a high torque. By using the improved forms of "Alnico" magnets in the device, the overall size of the device may be considerably reduced so that the final device is very compact.

What is claimed is:

1. A device for translating a fluid-pressure signal into an electric signal representative thereof, including in combination, a support, a stationary cross-spring pivot mounted on said support, a force-balance beam pivotly mounted on said cross-spring pivot, fluid-pressure-responsive means imposing a force on said beam in one direction, electric-energy-responsive means imposing an opposing force upon said beam, electric-signal-varying means positioned by said beam, oscillator-position-detector means connected under control of said electric-signal-varying means and connected to control said electric-energy-responsive means, a current output device, one side of said current output device being connected to said electric-signal-varying means and to said oscillator-position-detector means and to said electric-energy-responsive means, and means for connecting the other side of said current output device and said electric-energy-responsive means to a source of direct-current electricity, manually operable means for adjusting the zero or initial position of said force-balance beam, and means adjustable to vary the span of said device comprising means for mounting said fluid-pressure-responsive means for movement relative to said support parallel to said beam and toward and/or away from the axis of said cross-spring pivot so as to vary the distance between said fluid-pressure-responsive means and the axis of said cross-spring pivot.

2. A transducer having an air-pressure input and an electric output, said transducer including in combination, a support, a beam mounted on a pivot mounted on said support for rocking movement, a torque-producing means receiving the input-air pressure and engaging said beam at a point spaced from the axis of said pivot so as to rock said beam in one direction, electric-energy-signal-responsive means acting upon said beam in a direction opposite to said torque-producing means, electric-energy-signal-varying means positioned by said beam, a spheroidal contact between said support and said electric-energy-signal-varying means to provide angular alignment between said means and said beam, oscillator-position-detector means connected to said electric-energy-signal-varying means and to said electric-energy-signal-responsive means so that said electric signal established by said electric-energy-signal-varying means acts upon said electric-energy-signal-responsive means and causes said means to act upon said beam in a direction opposite to the torque-producing means, and a current output device, one side of said current output device being connected to a source of direct current, and the other side of said current output device being connected to said electric-signal-varying means and to said oscillator-position-detector means and to said electric-energy-signal-responsive means.

3. A transducer having an air-pressure input and electric current output, including in combination, a support, a cross-spring pivot mounted on said support, a beam mounted for rocking movement on said cross-spring pivot, an input element comprising a perforated manifold mounted on said support for movement parallel to said beam and toward or away from the axis of said cross-spring pivot, a bellows mounted on said manifold and communicating at its interior with a perforation through said manifold and connected at its free end to and engaging said beam at a point spaced from said cross-spring pivot so as to rock said beam in one direction about said cross-spring pivot, an armature mounted on said beam for movement therewith, a core mounted on said support and cooperating with said armature so that movement of said armature toward and away from said core varies the magnetic reluctance of the magnetic circuit formed by said armature and said core, an electric-signal-varying coil wound on said core and adapted for connection to a source of direct-current electricity so that changes in the magnetic reluctance of said magnetic circuit cause changes in the flow of electricity through said electric-signal-varying coil, an oscillator-position detector connected under the control of said electric-signal-varying coil, an electric-energy-responsive means located on said support and connected under the control of said oscillator-position detector and comprising at least one permanent magnet, a bracket mounted on said support, a torsion-angle pivot mounted on said bracket, a supporting arm mounted on said torsion-angle pivot for rocking thereabout, an output coil mounted on said supporting arm and located within the magnetic field of said magnet, a strap connecting one freely movable end of said supporting arm to one freely movable end of said beam to cause said beam to rock about said cross-spring pivot in a direction opposite to that in which said beam is rocked by said input element, a current output device, one side of said current output device being connected to said electric-signal-varying coil and to said oscillator-position detector and to said output coil, means for connecting the other side of said current output device and said output coil of said electric-energy-responsive means to a source of direct-current electricity, and means for adjusting the zero or initial position of said transducer including, a spring connected to said beam, a pair of screws one of which is connected to the end of said spring opposite to said beam, and manually operable means for adjusting said screws relative to each other to vary tension of said spring.

References Cited in the file of this patent
UNITED STATES PATENTS

| | | |
|---|---|---|
| 2,371,040 | Fisher et al. | Mar. 6, 1945 |
| 2,473,717 | Markson | June 21, 1949 |
| 2,614,163 | Roper | Oct. 14, 1952 |
| 2,688,253 | Markson | Sept. 7, 1954 |
| 2,780,101 | Kinkel | Feb. 5, 1957 |
| 2,788,665 | Wiancko | Apr. 16, 1957 |
| 2,814,312 | Booth et al. | Nov. 26, 1957 |
| 2,847,625 | Popowsky | Aug. 12, 1958 |